(12) United States Patent
Bird et al.

(10) Patent No.: US 7,865,889 B1
(45) Date of Patent: Jan. 4, 2011

(54) SYSTEMS AND METHODS FOR VERIFYING THE COMPATIBILITY OF SOFTWARE WITH A GROUP OF MANAGED NODES

(75) Inventors: Mark Bird, Highland, UT (US); David Eatough, Herriman, UT (US)

(73) Assignee: Crimson Corporation, Dover, DE (US)

( * ) Notice: Subject to any disclaimer, the term of this patent is extended or adjusted under 35 U.S.C. 154(b) by 1107 days.

(21) Appl. No.: 11/532,033

(22) Filed: Sep. 14, 2006

(51) Int. Cl.
*G06F 9/44* (2006.01)

(52) U.S. Cl. .................. 717/168; 717/169; 717/170; 717/178

(58) Field of Classification Search .................. 717/168
See application file for complete search history.

(56) References Cited

U.S. PATENT DOCUMENTS

| | | | |
|---|---|---|---|
| 5,617,533 A * | 4/1997 | Wu et al. ................. 714/38 |
| 5,991,774 A * | 11/1999 | Tate et al. ................. 707/203 |
| 6,202,207 B1 * | 3/2001 | Donohue ................. 717/173 |
| 7,089,552 B2 * | 8/2006 | Atallah ................. 717/175 |
| 7,178,141 B2 * | 2/2007 | Piazza ................. 717/168 |
| 2002/0078262 A1 | 6/2002 | Harrison et al. |
| 2002/0199180 A1 | 12/2002 | Donaldson et al. |
| 2003/0227477 A1 | 12/2003 | Kadiwala |
| 2004/0060044 A1 * | 3/2004 | Das et al. ................. 717/171 |
| 2005/0066233 A1 * | 3/2005 | Day et al. ................. 714/38 |
| 2006/0184917 A1 | 8/2006 | Troan et al. |

* cited by examiner

*Primary Examiner*—Thomas K Pham
(74) *Attorney, Agent, or Firm*—Austin Rapp & Hardman (57) ABSTRACT

In an exemplary embodiment, a deployment program on an administrative system receives user input to deploy target software to the managed nodes in a recipient group. In response, the deployment program identifies a pilot group to test the target software. The pilot group comprises a subset of the recipient group. Each managed node in the pilot group has a unique combination of N attributes. The deployment program deploys the target software to the pilot group prior to deploying the target software to other managed nodes in the recipient group that are not part of the pilot group.

20 Claims, 9 Drawing Sheets

SYSTEMS AND METHODS FOR VERIFYING THE COMPATIBILITY OF SOFTWARE WITH A GROUP OF MANAGED NODES

TECHNICAL FIELD

The present invention relates generally to computers and computer-related technology. More specifically, the present invention relates to systems and methods for verifying the compatibility of software with the managed nodes in an enterprise.

BACKGROUND

Many businesses and other types of enterprises have a number of computers that are used by employees. These computers are often interconnected to form a computer network. One or more system administrators may be responsible for managing the enterprise's computers. A system administrator's responsibilities typically include deploying and configuring new hardware and software, assigning user accounts and passwords, establishing security access levels, performing backups, troubleshooting reported problems, and so forth. In larger enterprises, some of these tasks may be divided between different system administrators. A computer system that is used by a system administrator is commonly referred to as an administrative system. The computers (or other electronic devices) that a system administrator manages may be referred to as managed nodes.

System administrators may use systems management software to perform various management-related tasks. There are a variety of systems management software products that are commercially available. An example of systems management software that is used by various enterprises is the LANDesk® Management Suite.

One of the challenges that a system administrator faces when deploying software is making sure that it is compatible with the managed nodes in the enterprise. Software that might function properly with one hardware/software configuration might not function properly with another hardware/software configuration. The task of verifying software compatibility may be quite difficult since there may be a wide variety of hardware/software configurations within the same enterprise. For example, an enterprise may include different types of computing devices, such as desktop computers, laptop computers, and other handheld devices (such as PDAs, cell phones, etc.). In addition, computers within the same enterprise may be running different versions of the same operating system, or even different operating systems. For example, some computers within an enterprise may be running Microsoft Windows XP®, while other computers may be running Microsoft Windows 2000®, a version of a Macintosh® operating system, a UNIX®-based operating system, etc.

One known approach to verifying software compatibility involves the use of test labs. Test labs, however, typically fail to adequately simulate the variety of systems found in the enterprise. Accordingly, even if no problems are detected when a particular piece of software is tested by a test lab, problems may occur when the software is deployed to the managed nodes within an enterprise.

System administrators are under a tremendous amount of pressure to perform their duties in an efficient and productive manner. Accordingly, benefits may be realized by improved systems and methods for verifying the compatibility of software with the managed nodes in an enterprise.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

A method for verifying the compatibility of target software with managed nodes in a recipient group is disclosed. The method may be implemented by an administrative system. In accordance with an embodiment, user input to deploy the target software to the managed nodes in the recipient group may be received. A pilot group may be identified to test the target software. The pilot group may comprise a subset of the recipient group. Each managed node in the pilot group may have a unique combination of N attributes. The target software may be deployed to the pilot group before the target software is deployed to other managed nodes in the recipient group that are not part of the pilot group.

In an embodiment, the pilot group may be monitored after the target software is deployed to the pilot group. In an embodiment, one or more problems that occur after the target software is deployed to the pilot group may be detected. A user may be notified about the one or more problems. The user may be permitted to perform one or more corrective operations to address the one or more problems.

In an embodiment, a determination may be made about whether one or more conditions are satisfied. If the one or more conditions are satisfied, the target software may be deployed to the other managed nodes in the recipient group that are not part of the pilot group. The target software may be deployed to all of the other managed nodes in the recipient group simultaneously. Alternatively, the target software may be deployed to different target groups within the recipient group at different times.

In an embodiment, identifying the pilot group may involve receiving a user's selection of the N attributes. Identifying the pilot group may involve determining values of the N attributes for each managed node in the recipient group. Identifying the pilot group may involve providing a data structure having a separate location for each unique combination of values for the N attributes, and populating the data structure with managed nodes from the recipient group that have corresponding attribute values.

A computer system that is configured to implement a method for verifying the compatibility of target software with managed nodes in a recipient group is also disclosed. The computer system includes a processor and memory in electronic communication with the processor. Instructions are stored in the memory. The instructions may be executable to implement the method for verifying the compatibility of target software with managed nodes in a recipient group discussed above. A computer-readable medium comprising executable instructions for implementing the method for verifying the compatibility of target software with managed nodes in a recipient group is also disclosed.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

Figure 1:
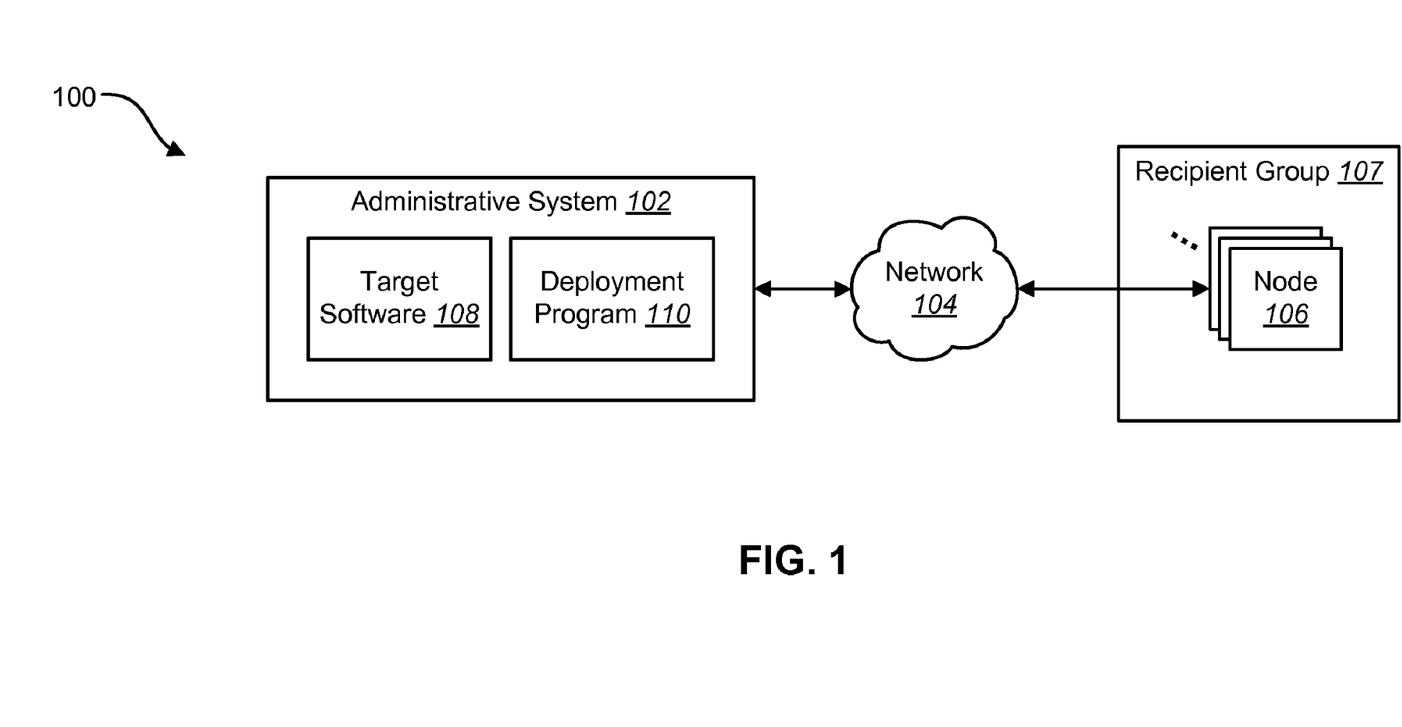
FIG. 1 is a block diagram that illustrates a system in which embodiments may be practiced.

FIG. 1 is a block diagram that illustrates a system 100 in which embodiments may be practiced. An administrative computer system 102 is connected to a computer network 104 of an enterprise. The administrative system 102 may be used to manage other computer systems that are also connected to the computer network 104. As indicated above, these computer systems will be referred to herein as managed nodes 106. The managed nodes 106 may be desktop computers, laptop computers, servers, personal digital assistants (PDAs), cellular telephones, printing devices, and so forth. The computer network 104 may include various components (such as routers, gateways, hubs, etc.) which allow the administrative system 102 and the managed nodes 106 to communicate via wired and/or wireless media.

At some point in time, a system administrator (or other user of the administrative system 102) may want to deploy software 108 to a group of managed nodes 106. The software 108 may be a new application, an update to or upgrade for an existing application, an update to or upgrade for an operating system, etc. In the present discussion, the software 108 to be deployed will be referred to as the target software 108. The group of managed nodes 106 that is intended to receive the target software 108 will be referred to as the "recipient group" 107.

In order to deploy the target software 108 to the recipient group 107, the system administrator may use a deployment program 110 that is provided on the administrative system 102. The deployment program 110 may be a component of system management software (e.g., the LANDesk Management Suite®) that is installed on the administrative system 102. Alternatively, the deployment program 110 may be a component within another application, a standalone application, a component within the administrative system's 102 operating system, etc.

Figure 2:
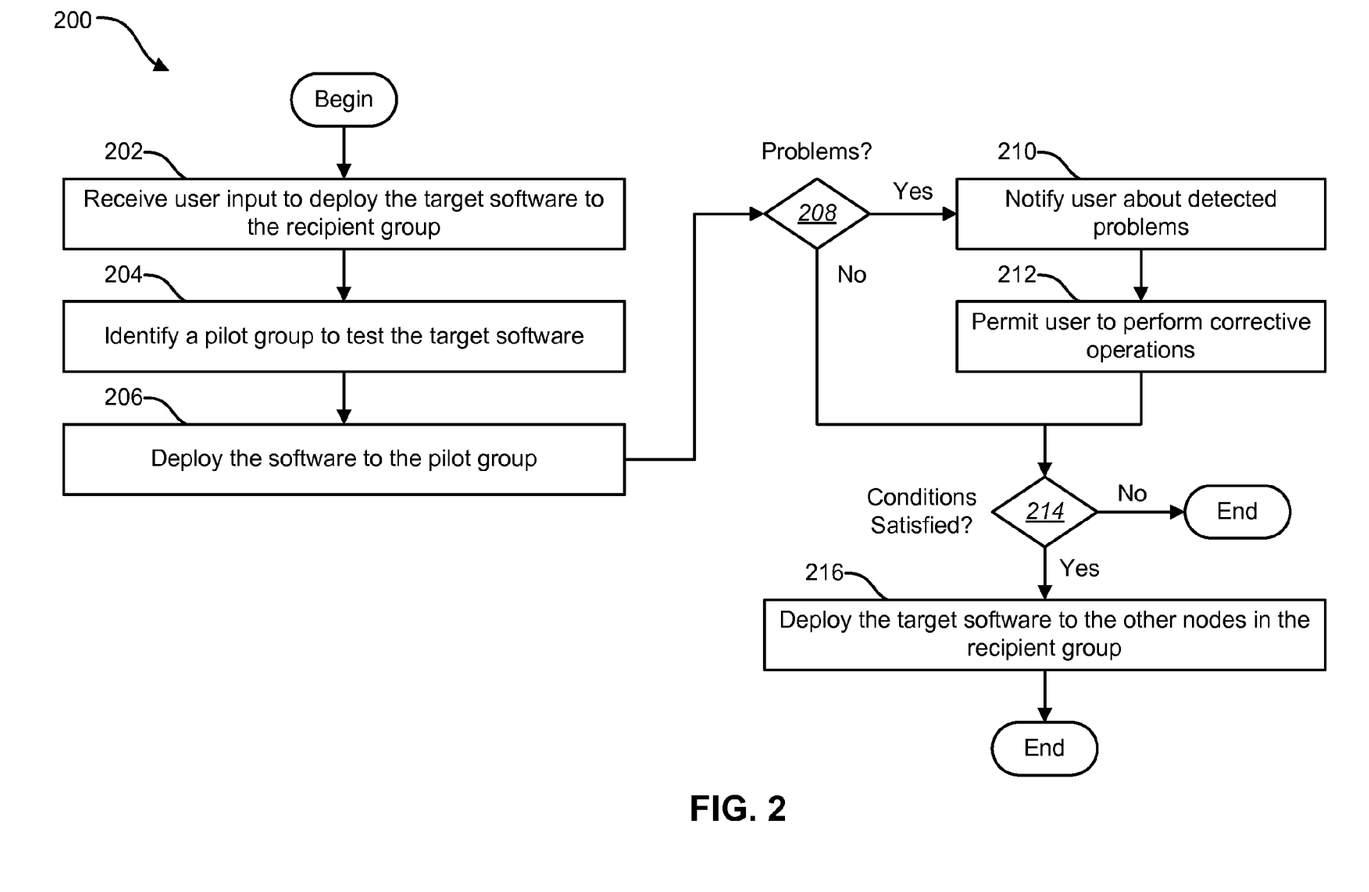
FIG. 2 is a flow diagram that illustrates the operation of the deployment program shown in FIG. 1 according to an embodiment.

FIG. 2 is a flow diagram that illustrates the operation of the deployment program 110 according to an embodiment. In particular, FIG. 2 illustrates a method 200 which may be implemented by the deployment program 110 in order to verify the compatibility of the target software 108 with the managed nodes 106 in the recipient group 107.

To initiate the process of deploying the target software 108 to the managed nodes 106 in the recipient group 107, a user (e.g., a system administrator) may input one or more commands to the deployment program 110 on the administrative system 102 which direct the deployment program 110 to deploy the target software 108. For example, the user may create a scheduled task to deploy the target software 108 to the recipient group 107.

In response to receiving 202 these command(s), the deployment program 110 identifies 204 what will be referred to as a "pilot group" to test the target software 108. The pilot group comprises a subset of the managed nodes 106 within the recipient group 107, and it represents the diversity of the managed nodes 106 in the recipient group 107 with respect to certain user-specified attributes. In particular, each managed node 106 in the pilot group has a combination of N attributes (which may be selected by the user) that is unique relative to all of the other managed nodes 106 in the pilot group. This will be discussed in greater detail below. Also, an exemplary method for identifying 204 a pilot group will be discussed below.

As mentioned above, the user may create a scheduled task to deploy the target software 108 to the recipient group. Where this occurs, the pilot group that is identified 204 may be associated with the scheduled task itself. Alternatively, the pilot group may be associated with the target software 108, the delivery method, another component of the scheduled task, etc.

Once the pilot group has been identified 204, the deployment program 110 deploys 206 the target software 108 to the pilot group. The target software 108 is not deployed to the other managed nodes 106 in the recipient group 107 at this time.

Hardware and/or software compatibility problems may occur after the target software 108 has been deployed 206 to the managed nodes 106 that are in the pilot group. These compatibility problems may cause a variety of undesirable effects, such as incorrect operation of the target software 108, operating system crashes, other software crashes, overall performance degradation, and so forth. Accordingly, once the target software 108 has been deployed to the managed nodes 106 in the pilot group, the deployment program 110 monitors 208 these managed nodes 106 for the purpose of detecting problems that occur.

In the context of the depicted method 200, the term "monitor" should be interpreted broadly to encompass any act or collection of acts that results in the deployment program 110 obtaining information about problems that occur when the target software 108 runs on a managed node 106 in the pilot group. The deployment program 110 may monitor 208 the managed nodes 106 in the pilot group by periodically querying these managed nodes 106 for information about problems with the target software 108. Alternatively, the deployment program 110 may monitor 208 the managed nodes 106 in the pilot group by simply waiting to receive reports from these managed nodes 106.

If problems are detected with the performance of the target software 108 on the managed nodes 106 in the pilot group, the deployment program 110 may notify 210 the user about the detected problems. The deployment program 110 may also permit 212 the user to perform one or more corrective operations to address the detected problems. For example, the deployment program 110 may assist the user to locate a patch for the target software 108 that may fix the detected problems.

Once it is determined 214 that one or more conditions have been satisfied, the target software 108 may be deployed 216 to the other managed nodes 106 in the recipient group 107 (i.e., those that are not in the pilot group). The conditions may be, for example, that no problems have been detected within a certain period of time, or that the user has performed corrective operations to address problems that have been detected. The target software 108 may be deployed 216 to all of the remaining managed nodes 106 in the recipient group 107 at the same time. Alternatively, deployment of the target software 108 to the remaining managed nodes 106 may be staggered so that different "target groups" receive the target software 108 at different times. This will be explained in greater detail below.

As mentioned above, the method 200 that is shown in FIG. 2 may be implemented by the deployment program 110 in the system 100 that is shown in FIG. 1. Alternatively, the method 200 may be implemented by multiple computer programs, i.e., different computer programs may implement different aspects of the method 200. Alternatively still, one or more aspects of the method 200 may be implemented in hardware.

Figure 3:
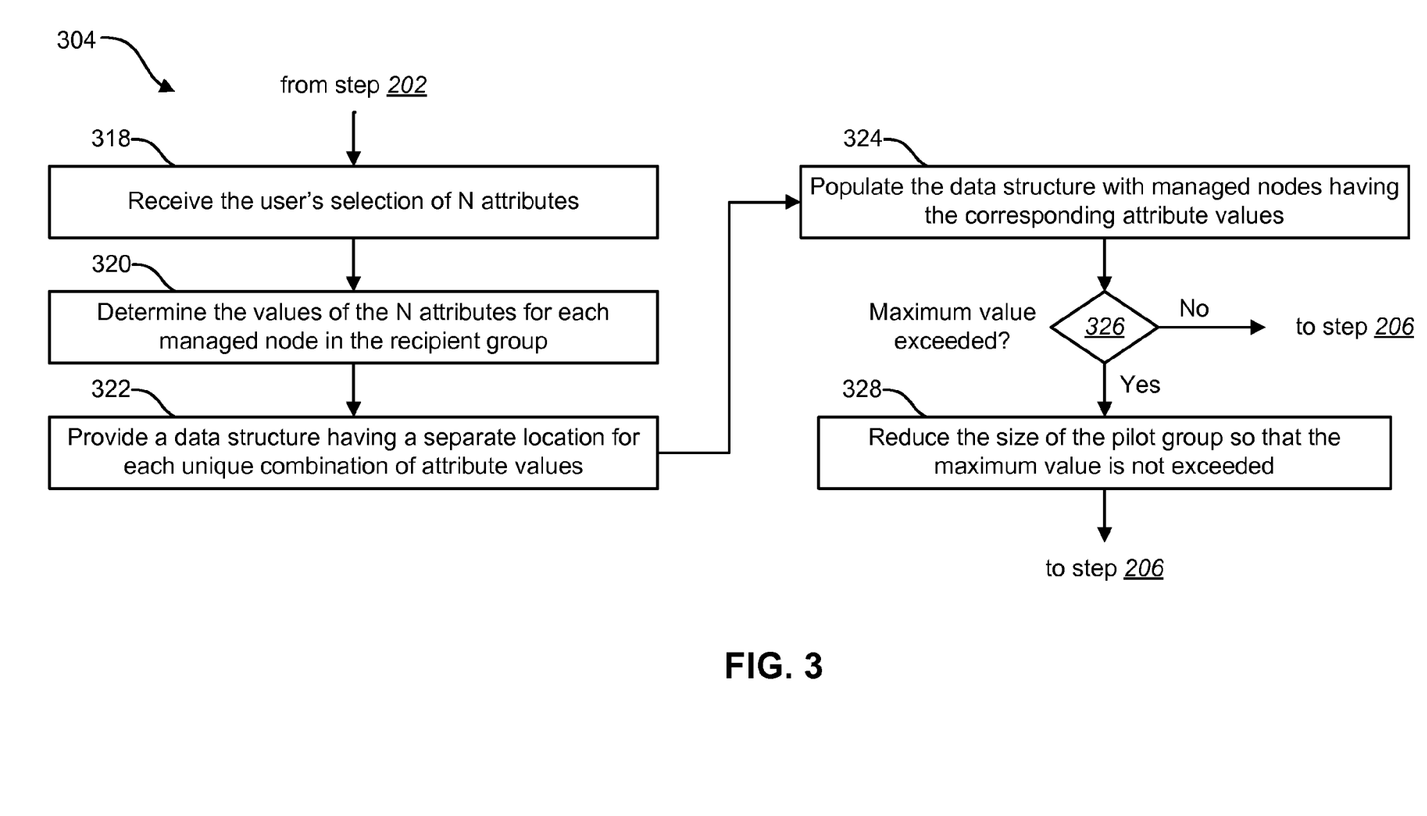
FIG. 3 is a flow diagram that illustrates a method for identifying a pilot group according to an embodiment.

Part of the method 200 for verifying the compatibility of the target software 108 with the managed nodes 106 in the recipient group 107 that is illustrated in FIG. 2 involves identifying 204 a pilot group. FIG. 3 is a flow diagram that illustrates a method 304 for identifying a pilot group according to an embodiment.

The illustrated method 304 may be performed by the deployment program 110 in response to receiving 202 one or more commands which direct the deployment program 110 to deploy the target software 108 to the recipient group 107, as discussed above. Once this occurs, the deployment program 110 may permit the user to select various attributes of the hardware and/or software configuration of a managed node 106 that the user would like to have represented in the pilot group. For example, if the user would like the pilot group to comprise managed nodes 106 with different operating systems and different types of Internet browsers, the system administrator may select an "operating system" attribute and an "Internet browser" attribute. Although this example involves the selection of two attributes, more than two attributes may be selected. Alternatively, a single attribute may be selected.

Once the deployment program 110 receives 318 the user's selection of one or more attributes, it determines 320 the values of the selected attributes for each managed node 106 in the recipient group 107. In this context, the "value" of an attribute refers to a specific property or characteristic of a managed node 106, rather than a general category. For example, "Microsoft Internet Explorer® version 6.x" is an example of a possible value for the "Internet browser" attribute. To determine the values of the "Internet browser" attribute for the managed nodes 106 in the recipient group 107, the deployment program 110 would, for each managed node 106 in the recipient group 107, determine 320 the type of Internet browser that is being used.

There are a number of ways that the attribute values for the managed nodes 106 in the recipient group 107 may be determined 320. For example, the deployment program 110 may query (e.g., using one or more SQL queries) a database of information about each of the managed nodes 106 in the recipient group 107.

Once the values of the selected attributes have been determined 320, the deployment program 110 provides 322 a data structure having a separate location for each possible unique combination of the values of the selected attributes. There are many different kinds of data structures that may be used. A specific example involving the use of a two-dimensional array will be discussed below. Some other examples of data structures that may be used include a hash table, a map, etc.

The data structure is then populated 324 with managed nodes 106 having the corresponding attribute values. More specifically, an attempt is made to fill each location in the data structure with a managed node 106 that has the combination of attribute values that correspond to that location. This will be discussed in greater detail in connection with the specific example that is shown below.

After the data structure is populated 324, the size of the pilot group may be larger than the user would prefer. To address this issue, the deployment program 110 may allow the user to define a maximum size for the pilot group. The ability to control the size of the pilot group can help to ensure that the enterprise's IT help desk is not overwhelmed when the target software 108 is deployed 206 to the pilot group.

The maximum size may be expressed as a percentage (e.g., the size of the pilot group may not exceed 10% of the size of the recipient group 107), a raw number (e.g., the size of the pilot group may not exceed 500), etc. If it is determined 326 that the size of the pilot group exceeds the maximum size that has been defined, then the size of the pilot group may be reduced 328 so that the maximum size is not exceeded. There are a number of ways that the size of the pilot group may be reduced 328. For example, if the maximum size is N and the size of the pilot group initially exceeds N, then N managed nodes 106 may be randomly selected from the initial pilot group.

As stated, FIG. 3 illustrates a method 304 for identifying a pilot group, which may be performed as part of an overall method 200 for verifying the compatibility of target software 108 with the managed nodes 106 in the recipient group 107. Once the deployment program 110 identifies a pilot group in accordance with the illustrated method 304, then the target software 108 may be deployed 206 to the pilot group, as discussed above.

Figure 4:
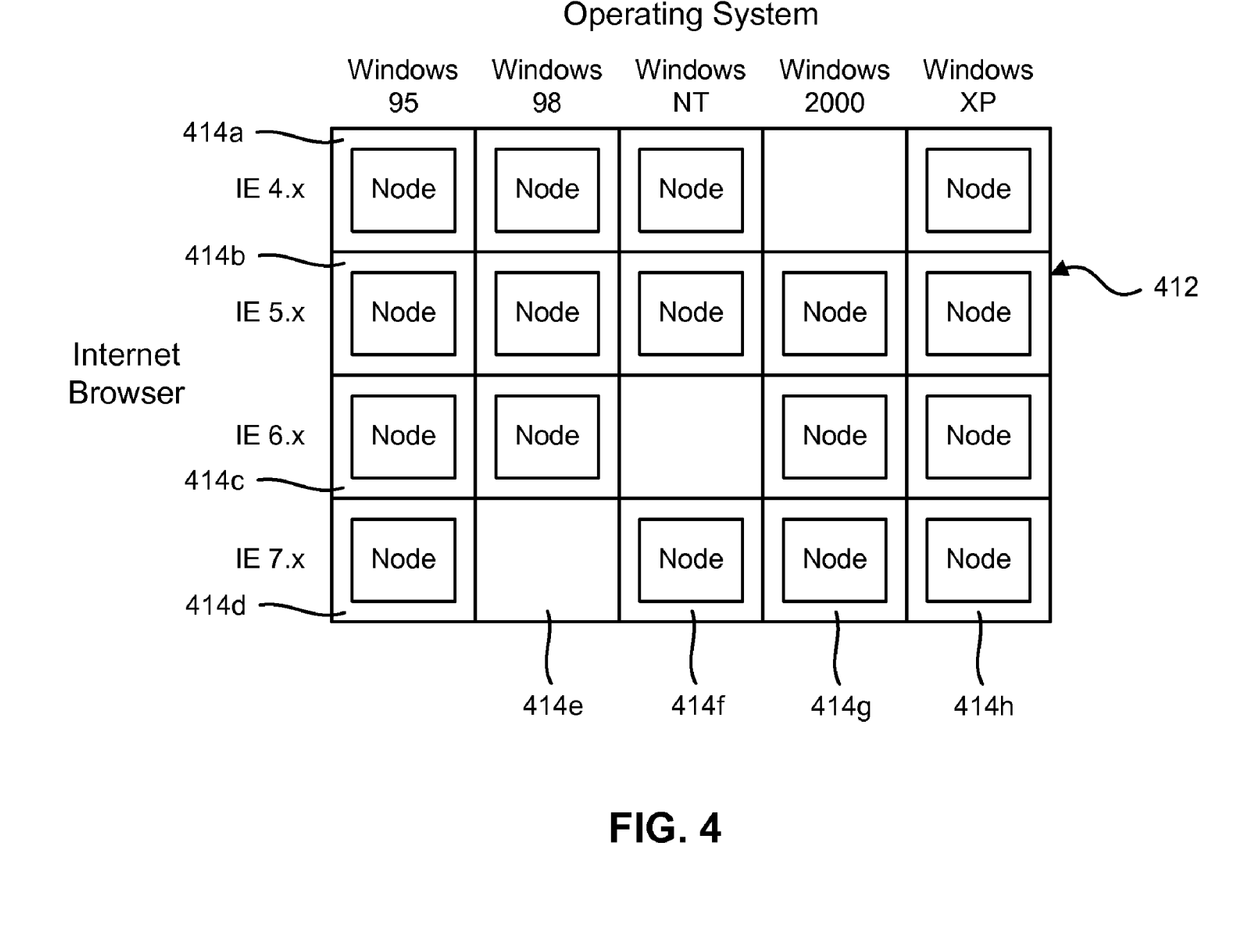
FIG. 4 illustrates an example of a data structure having a separate location for each possible unique combination of the values of certain user-selected attributes.

As discussed above, part of the method 304 for identifying a pilot group that is illustrated in FIG. 3 involves providing 322 a data structure having a separate location for each possible unique combination of the values of certain user-selected attributes. FIG. 4 illustrates an example of such a data structure 412.

The data structure 412 that is shown in FIG. 4 is an N-dimensional array 412, where N refers to the number of attributes that have been selected. In the illustrated example, the system administrator has selected two attributes, namely "operating system" and "Internet browser." Thus, the array 412 is a two-dimensional array 412.

As discussed above, part of the method 304 for identifying a pilot group that is illustrated in FIG. 3 involves determining the values of the user-selected attributes for each managed node 106 in the recipient group 107. In the illustrated example, five different values are identified for the operating system attribute. In other words, there are five different types of operating systems that are running on the managed nodes 106 in the recipient group 107: Windows 95, Windows 98, Windows NT, Windows 2000, and Windows XP. Four different values are identified for the Internet browser attribute, i.e., there are four different types of Internet browsers that are running on the managed nodes 106 in the recipient group 107: Microsoft Internet Explorer® (IE) version 4.x, IE version 5.x, IE version 6.x, and IE version 7.x.

The array 412 includes a separate location 414 for each possible combination of the values of the Internet browser and operating system attributes. More specifically, for each type of operating system that is identified, there is a separate location 414 in the array 412 for each type of Internet browser that is identified. For example, for Windows 95, there is a location 414a for IE 4.x, a location 414b for IE 5.x, a location 414c for IE 6.x, and a location 414d for IE 7.x. Also, for each type of Internet browser that is identified, there is a separate location 414 in the array 412 for each type of operating system that is identified. For example, for IE 7.x, there is a location 414d for Windows 95, a location 414e for Windows 98, a location 414f for Windows NT, a location 414g for Windows 2000, and a location 414h for Windows XP.

FIG. 4 also illustrates how the array 412 may appear after it has been populated 324 with managed nodes 106. In the depicted example, the array 412 is not completely full (i.e., some locations 414 in the array 412 do not include a managed node 106). Where a location in the array 412 is empty, this means that there is not a managed node 106 in the recipient group 107 that includes the attribute values that correspond to that location. In the depicted example, there is not a managed node 106 in the recipient group 107 that is running Windows 98 and IE version 7.x. Also, there is not a managed node 106 in the recipient group 107 that is running Windows NT and IE version 6.x. Also, there is not a managed node 106 in the recipient group 107 that is running Windows 2000 and IE version 4.x.

Figure 5:
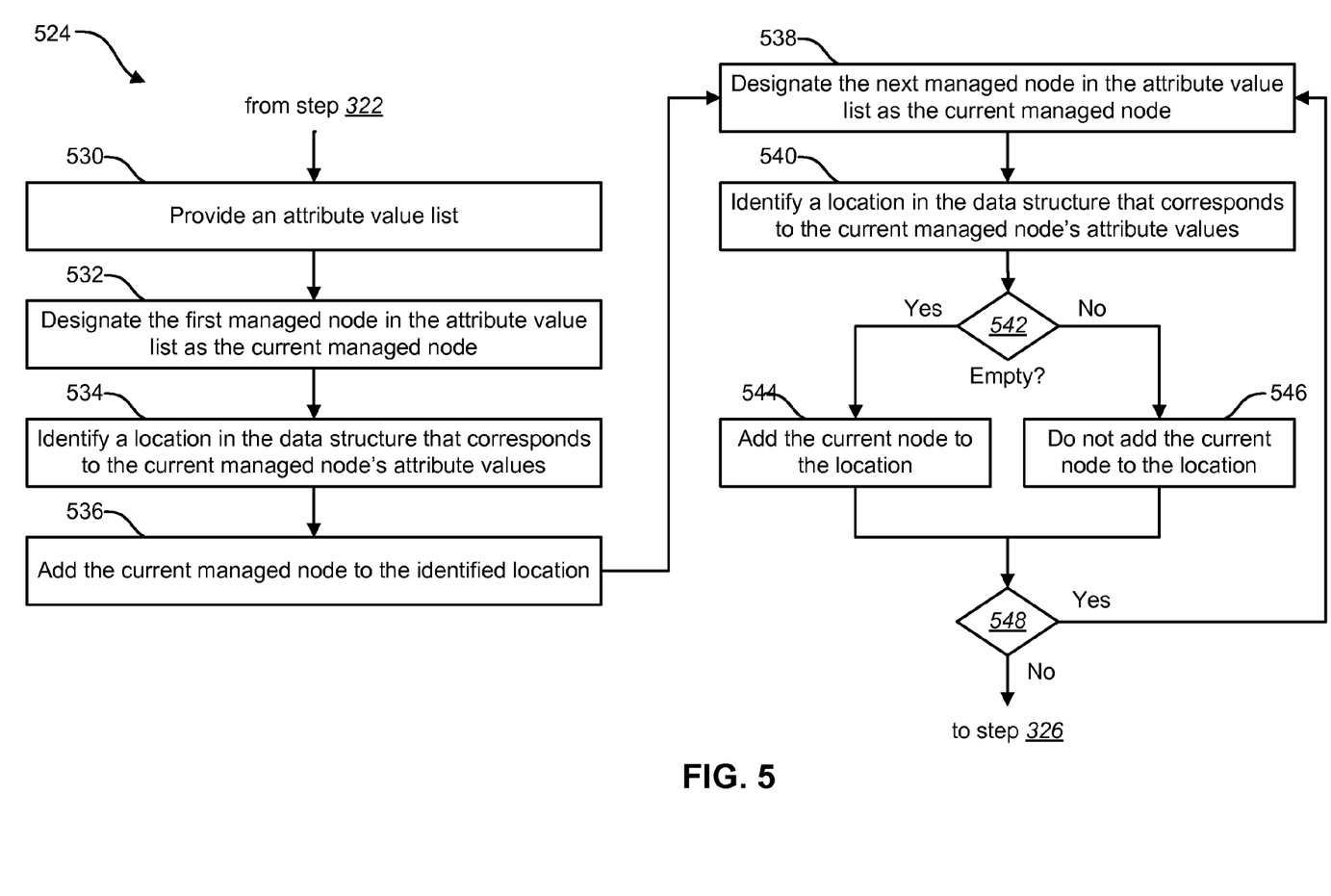
FIG. 5 is a flow diagram that illustrates a method for populating a data structure according to an embodiment.

As discussed above, part of the method 304 for identifying a pilot group that is illustrated in FIG. 3 involves populating 324 a data structure 412. FIG. 5 is a flow diagram that illustrates a method 524 for populating a data structure 412 according to an embodiment.

A list may be provided 530 which includes the attribute values for each managed node 106 in the recipient group 107. Such a list will be referred to herein as an "attribute value list." The first managed node 106 in the attribute value list is designated 532 as the current managed node 106. In this context, the term "current managed node" 106 refers to the managed node 106 that is being processed at the present time. A location 414 in the data structure 412 is identified 534 that corresponds to the current managed node's 106 attribute values, and the current managed node 106 is added 536 to the identified location.

The next managed node 106 in the attribute value list is then designated 538 as the current managed node 106, and a location 414 in the data structure 412 is identified 540 that corresponds to the (new) current managed node's 106 attribute values. If it is determined 542 that the identified location 414 is empty (i.e., a managed node 106 has not already been added to that location 414), the current managed node 106 is added 544 to the identified location 414. However, if it is determined 542 that the identified location 414 is not empty (i.e., a managed node 106 has already been added to that location 414), then the current managed node 106 is not added 546 to the identified location 414.

At this point in the method 524 it is determined 548 whether there are any additional managed nodes 106 in the attribute value list that have not been processed. If not, then the method 524 for populating a data structure 412 ends. If there is at least one additional managed node 106 in the attribute value list that has not been processed, then the method 524 returns to step 538 and proceeds as discussed above.

The method 524 that is illustrated in FIG. 5 shows a "first in wins" mechanism. Additional steps to randomly replace a node managed 106 that was previously added to the data structure 412 could also be implemented.

Figure 6:
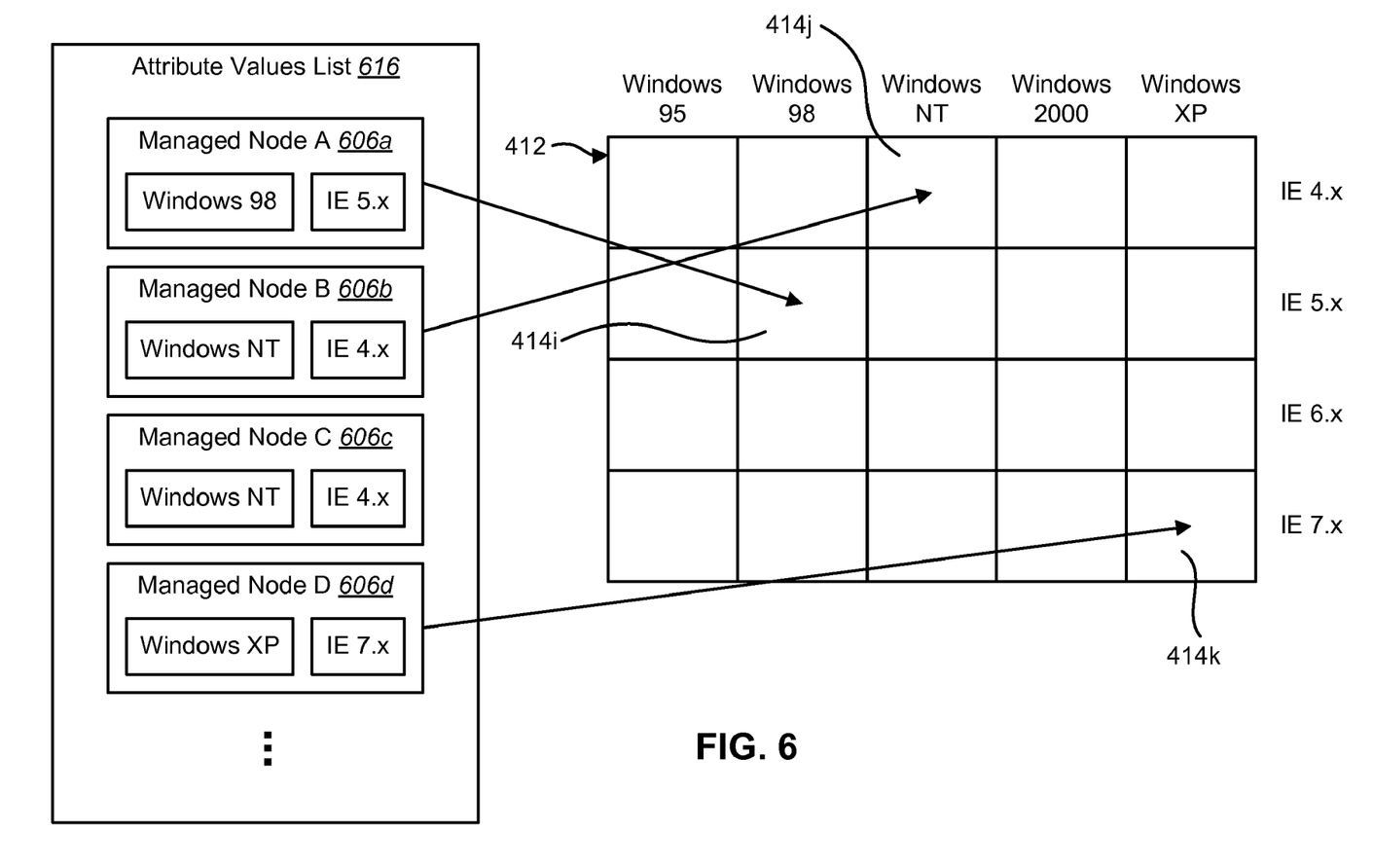
FIG. 6 illustrates an example showing how the method for populating a data structure that is shown in FIG. 5 may be implemented.

FIG. 6 illustrates an example showing how the method 524 for populating a data structure 412 that is shown in FIG. 5 may be implemented. The data structure 412 that is shown in FIG. 6 is the two-dimensional array 412 that was discussed above in connection with FIG. 4.

An attribute value list 616 is provided 530. As discussed above, the attribute values list 616 includes the attribute values for each managed node 106 in the recipient group 107.

The first managed node 606a in the attribute values list 616, which will be referred to as managed node A 606a, is initially designated 532 as the current managed node. The location 414i in the array 412 that corresponds to managed node A's 606a attribute values (i.e., the Windows 98 operating system and the IE 5.x Internet browser) is identified 534, and managed node A 606a is added 536 to this location 414i.

The next managed node 606b in the attribute values list 616, which will be referred to as managed node B 606b, is then designated 538 as the current managed node. The location 414j in the array 412 that corresponds to managed node B's 606b attribute values (i.e., the Windows NT operating system and the IE 4.x Internet browser) is identified 540. It is determined 542 that this location 414j is empty, and as a result managed node B 606b is added 544 to this location 414j.

The next managed node 606c in the attribute values list 616, which will be referred to as managed node C 606c, is then designated 538 as the current managed node. The location 414j in the array 412 that corresponds to managed node C's 606c attribute values (i.e., the Windows NT operating system and the IE 4.x Internet browser) is identified 540. However, because it is determined 542 that this location 414j is not empty (managed node B 606b was previously added 544 to this location 414j), managed node C 606c is not added 546 to this location 414j.

The next managed node 606d in the attribute values list 616, which will be referred to as managed node D 606d, is then designated 538 as the current managed node. The location 414k in the array 412 that corresponds to managed node D's 606d attribute values (i.e., the Windows XP operating system and the IE 7.x Internet browser) is identified 540. It is determined 542 that this location 414k is empty, and as a result managed node D 606d is added 544 to this location 414k.

The method 524 for populating the data structure 412 that is shown in FIG. 5 continues as long as there are additional managed nodes 606 in the attribute values list 616 that have not been processed. Alternatively, the deployment program 110 may discontinue populating 324 the data structure 412 when the data structure 412 has become completely full.

Figure 7:
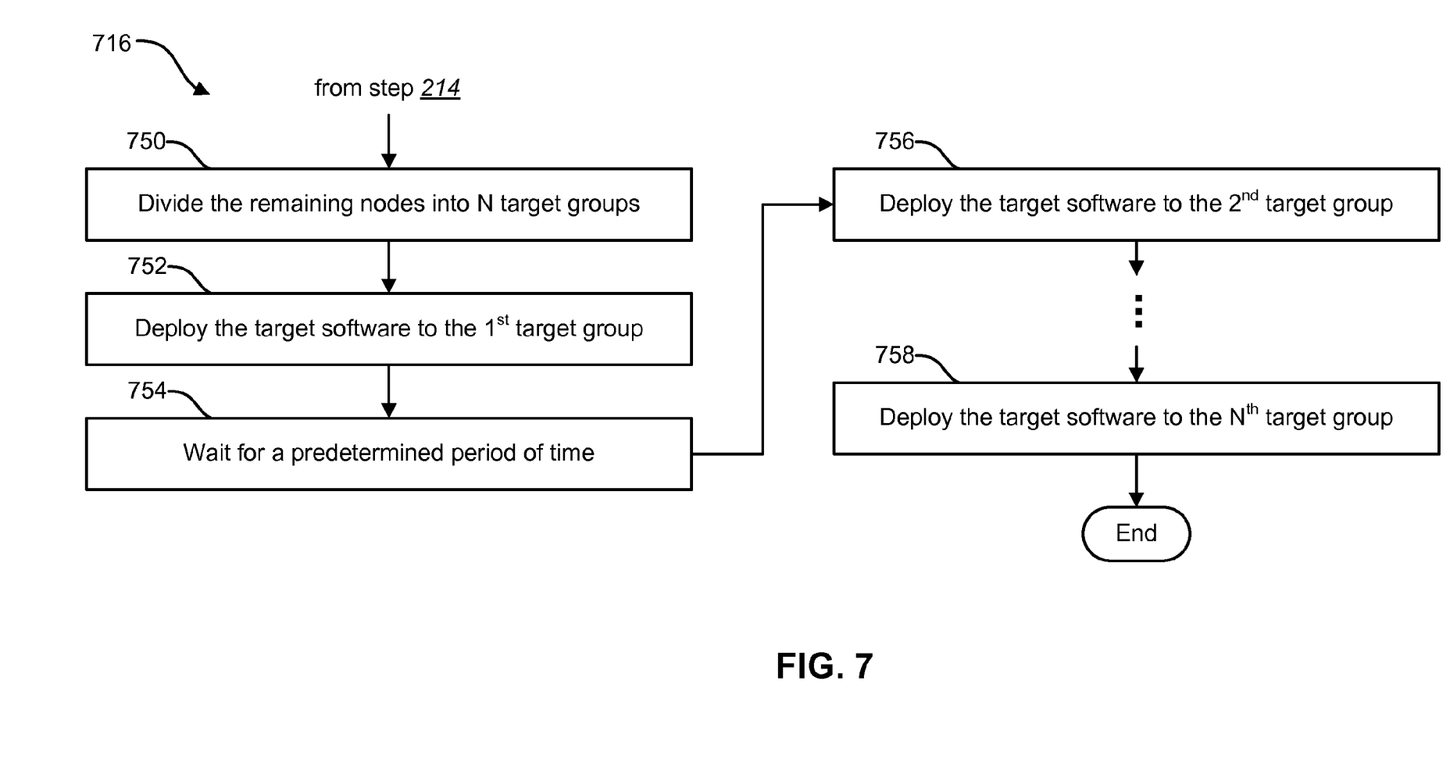
FIG. 7 is a flow diagram that illustrates a method for deploying the target software to the remaining managed nodes in the recipient group according to an embodiment.

As discussed above, part of the method 200 for verifying the compatibility of the target software 108 with the managed nodes 106 in the recipient group 107 that is illustrated in FIG. 2 involves deploying 216 the target software 108 to the remaining managed nodes 106 in the recipient group 107 (i.e., those that are not part of the pilot group). FIG. 7 is a flow diagram that illustrates a method 716 for deploying the target software 108 to the remaining managed nodes 106 in the recipient group 107 according to an embodiment.

In accordance with the depicted method 716, the remaining managed nodes 106 are divided 750 into N target groups. After the target software 108 is deployed 752 to the first target group, the deployment program 110 waits 754 for a predetermined period of time before deploying 756 the target software 108 to the second target group. This sequence of deploying the target software 108 to a target group, waiting for a predetermined period of time, and deploying the target software to another target group continues until the target software 108 is deployed 758 to the $N^{th}$ target group.

In some embodiments, the period of time that the deployment program 110 waits between deploying 206 the target software 108 to the pilot group and deploying 752 the target software 108 to the first target group is greater than the period of time that the deployment program 110 waits between deploying the target software 108 to two different target groups. This gives the user more time to address any problems that may occur when the target software 108 is deployed to the pilot group.

Figure 8:
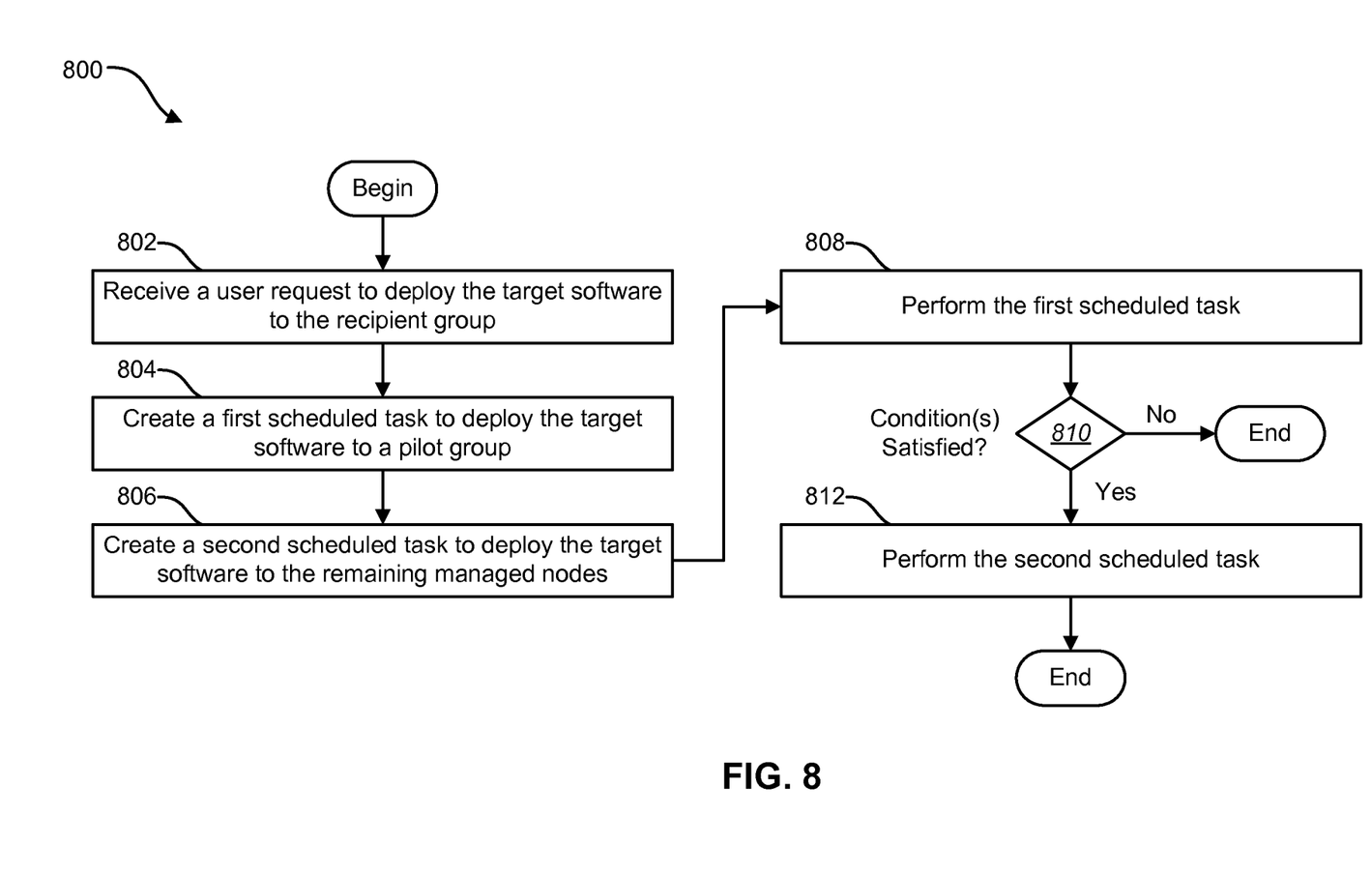
FIG. 8 illustrates a method which may be implemented by the deployment program in order to verify the compatibility of the target software with the managed nodes in the recipient group when the user creates a scheduled task to deploy the target software to the recipient group.

As discussed above, a user may create a scheduled task to deploy the target software 108 to the recipient group 107. FIG. 8 illustrates a method 800 which may be implemented by the deployment program 110 in order to verify the compatibility of the target software 108 with the managed nodes 106 in the recipient group 107 when the user creates a scheduled task to deploy the target software 108 to the recipient group 107.

In response to receiving 802 a user request to create a scheduled task to deploy the target software 108 to the recipient group 107, the deployment program 110 creates two separate scheduled tasks. In particular, the deployment program 110 creates 804 a first scheduled task to deploy the target software 108 to a pilot group. The deployment program 110 also creates 806 a second scheduled task to deploy the target software 108 to the remaining managed nodes 106 in the recipient group 107 if certain conditions are satisfied.

The deployment program 110 then performs 808 the first scheduled task. As part of performing 808 the first scheduled task, the deployment program 110 may identify 204 a pilot group and deploy the target software 108 to the managed nodes 106 in the pilot group, as discussed above in connection with FIG. 2.

If it is determined 810 that one or more conditions are satisfied, then the deployment program 110 performs 812 the second scheduled task. The one or more conditions may be that no problems with the target software 108 are detected within a certain period of time, or that the system administrator has performed corrective operations to address any problems that are detected. As part of performing 812 the second scheduled task, the deployment program 110 may deploy 216 the target software 108 to the remaining managed nodes 106 in the recipient group 107, as discussed above in connection with FIG. 2.

Figure 9:
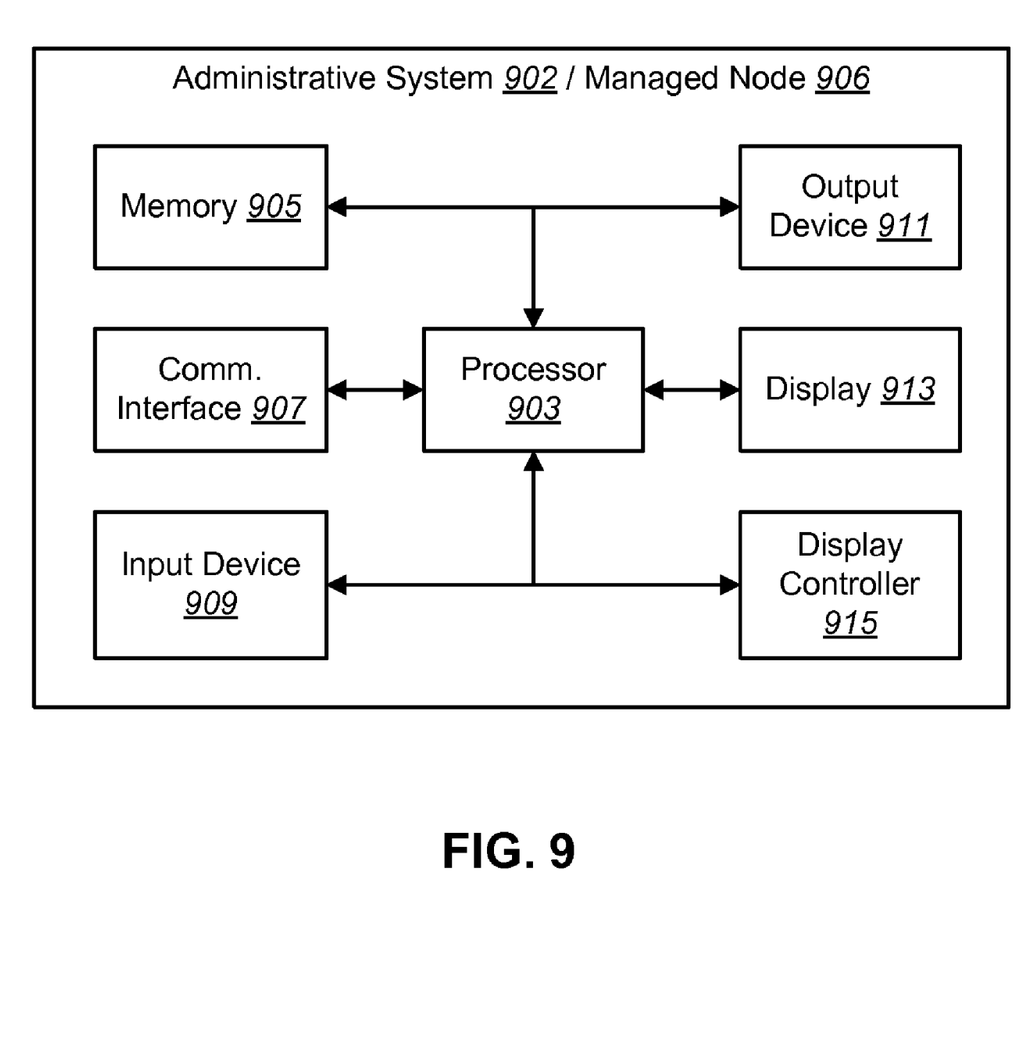
FIG. 9 illustrates various components that may be utilized in an administrative system and/or a managed node.

FIG. 9 illustrates various components that may be utilized in an administrative system 902 and/or a managed node 906. The illustrated components may be located within the same physical structure or in separate housings or structures.

The administrative system 902 and/or managed node 906 includes a processor 903 and memory 905. The processor 903 controls the operation of the administrative system 902 and/or managed node 906 and may be embodied as a microprocessor, a microcontroller, a digital signal processor (DSP) or other device known in the art. The processor 903 typically performs logical and arithmetic operations based on program instructions stored within the memory 905.

The administrative system 902 and/or managed node 906 typically also includes one or more communication interfaces 907 for communicating with other electronic devices. The communication interfaces 907 may be based on wired communication technology, wireless communication technology, or both. Examples of different types of communication interfaces 907 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The administrative system 902 and/or managed node 906 typically also includes one or more input devices 909 and one or more output devices 911. Examples of different kinds of input devices 909 include a keyboard, mouse, microphone, remote control device, button, joystick, trackball, touchpad, lightpen, etc. Examples of different kinds of output devices 911 include a speaker, printer, etc. One specific type of output device which is typically included in a computer system is a display device 913. Display devices 913 used with embodiments disclosed herein may utilize any suitable image projection technology, such as a cathode ray tube (CRT), liquid crystal display (LCD), light-emitting diode (LED), gas plasma, electroluminescence, or the like. A display controller 915 may also be provided, for converting data stored in the memory 905 into text, graphics, and/or moving images (as appropriate) shown on the display device 913.

Of course, FIG. 9 illustrates only one possible configuration of a administrative system 902 and/or managed node 906. Various other architectures and components may be utilized.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for verifying the compatibility of target software with managed nodes in a recipient group, comprising:
   receiving user input to deploy the target software to the managed nodes in the recipient group;
   identifying a pilot group to test the target software, wherein the pilot group comprises a subset of the recipient group, and wherein each managed node in the pilot group has a unique combination of N attributes; and
   deploying the target software to the pilot group prior to deploying the target software to other managed nodes in the recipient group that are not part of the pilot group.

2. The method of claim 1, further comprising monitoring the pilot group after deploying the target software to the pilot group.

3. The method of claim 1, further comprising:
   detecting one or more problems that occur after deploying the target software to the pilot group;
   notifying a user about the one or more problems; and
   permitting the user to perform one or more corrective operations to address the one or more problems.

4. The method of claim 1, further comprising:
   determining whether one or more conditions are satisfied; and
   if the one or more conditions are satisfied, deploying the target software to the other managed nodes in the recipient group that are not part of the pilot group.

5. The method of claim 4, wherein the target software is deployed to all of the other managed nodes in the recipient group simultaneously.

6. The method of claim 4, wherein the target software is deployed to different target groups within the recipient group at different times.

7. The method of claim 1, wherein identifying the pilot group comprises receiving a user's selection of the N attributes.

8. The method of claim 1, wherein identifying the pilot group comprises determining values of the N attributes for each managed node in the recipient group.

9. The method of claim 1, wherein identifying the pilot group comprises:
   providing a data structure having a separate location for each unique combination of values for the N attributes; and
   populating the data structure with managed nodes from the recipient group that have corresponding attribute values.

10. The method of claim 1, wherein the method is implemented by an administrative system.

11. A computer system that is configured to implement a method for verifying the compatibility of target software with managed nodes in a recipient group, the computer system comprising:
   a processor;
   memory in electronic communication with the processor;
   instructions stored in the memory, the instructions being executable to:
      receive user input to deploy the target software to the managed nodes in the recipient group;
      identify a pilot group to test the target software, wherein the pilot group comprises a subset of the recipient group, and wherein each managed node in the pilot group has a unique combination of N attributes; and
      deploy the target software to the pilot group prior to deploying the target software to other managed nodes in the recipient group that are not part of the pilot group.

12. The computer system of claim 11, wherein the instructions are also executable to:
   determine whether one or more conditions are satisfied; and
   if the one or more conditions are satisfied, deploy the target software to the other managed nodes in the recipient group that are not part of the pilot group.

13. The computer system of claim 12, wherein the target software is deployed to all of the other managed nodes in the recipient group simultaneously.

14. The computer system of claim 12, wherein the target software is deployed to different target groups within the recipient group at different times.

15. The computer system of claim 11, wherein identifying the pilot group comprises receiving a user's selection of the N attributes.

16. A computer-readable medium comprising executable instructions for implementing a method for verifying the compatibility of target software with managed nodes in a recipient group, the method comprising:

receiving user input to deploy the target software to the managed nodes in the recipient group;

identifying a pilot group to test the target software, wherein the pilot group comprises a subset of the recipient group, and wherein each managed node in the pilot group has a unique combination of N attributes; and deploying the target software to the pilot group prior to deploying the target software to other managed nodes in the recipient group that are not part of the pilot group.

17. The computer-readable medium of claim 16, further comprising:

determining whether one or more conditions are satisfied; and if the one or more conditions are satisfied, deploying the target software to the other managed nodes in the recipient group that are not part of the pilot group.

18. The computer-readable medium of claim 17, wherein the target software is deployed to all of the other managed nodes in the recipient group simultaneously.

19. The computer-readable medium of claim 17, wherein the target software is deployed to different target groups within the recipient group at different times.

20. The computer-readable medium of claim 16, wherein identifying the pilot group comprises receiving a user's selection of the N attributes.

* * * * *